(12) United States Patent
Parker et al.

(10) Patent No.: US 10,772,259 B2
(45) Date of Patent: Sep. 15, 2020

(54) LAWNMOWER ATTACHMENT ASSEMBLY

(71) Applicant: Timmy J. Parker, Nashville, NC (US)

(72) Inventors: Timmy J. Parker, Nashville, NC (US); James B. Wallace, Nashville, NC (US); Ty Hagler, Durham, NC (US); Prasad Joshi, Raleigh, NC (US); Seth Teeples, Cary, NC (US); Patrick Murphy, Apex, NC (US)

(73) Assignee: Timmy J. Parker, Nashville, NC (US)

( * ) Notice: Subject to any disclaimer, the term of this patent is extended or adjusted under 35 U.S.C. 154(b) by 0 days.

(21) Appl. No.: 16/038,103

(22) Filed: Jul. 17, 2018

(65) Prior Publication Data

US 2019/0053428 A1    Feb. 21, 2019

Related U.S. Application Data

(60) Provisional application No. 62/535,845, filed on Jul. 22, 2017.

(51) Int. Cl.
| | |
|---|---|
| *A01D 43/16* | (2006.01) |
| *A01D 43/00* | (2006.01) |
| *F16M 13/02* | (2006.01) |
| A01D 101/00 | (2006.01) |

(52) U.S. Cl.
CPC ............. *A01D 43/00* (2013.01); *A01D 43/16* (2013.01); *F16M 13/02* (2013.01); *A01D 2101/00* (2013.01); *F16M 2200/021* (2013.01); *F16M 2200/025* (2013.01); *F16M 2200/06* (2013.01)

(58) Field of Classification Search
CPC .... A01D 2101/00; A01D 43/00; A01D 43/16; A01D 43/08; A01D 37/00; A01D 39/00; A01D 39/005; A01D 41/00; F16M 13/02; F16M 2200/021; F16M 2200/025; F16M 2200/06
USPC ........ 248/652, 637, 644, 645, 647, 657, 662
See application file for complete search history.

(56) References Cited

U.S. PATENT DOCUMENTS

| 3,782,484 | A | * | 1/1974 | Martin | .................... | E21C 27/28 |
|---|---|---|---|---|---|---|
| | | | | | | 173/193 |
| 8,973,343 | B2 | * | 3/2015 | Bell | ....................... | A01D 34/66 |
| | | | | | | 56/12.7 |
| 9,560,803 | B2 | * | 2/2017 | Kobayashi | ............. | A01D 43/16 |
| 2010/0000192 | A1 | * | 1/2010 | Robison | ................. | A01D 34/84 |
| | | | | | | 56/10.2 R |
| 2015/0101302 | A1 | * | 4/2015 | Cooper | .................. | A01D 43/16 |
| | | | | | | 56/13.7 |
| 2015/0305237 | A1 | * | 10/2015 | Goudy | ................. | A01D 34/661 |
| | | | | | | 56/255 |
| 2017/0006760 | A1 | * | 1/2017 | Nielsen | ................ | A01D 34/661 |
| 2017/0156262 | A1 | * | 6/2017 | Reichard | ................ | A01D 34/64 |

(Continued)

*Primary Examiner* — Nkeisha Smith
(74) *Attorney, Agent, or Firm* — Forrest Firm, P.C.

(57) ABSTRACT

The assembly described herein is secured to lawn equipment for adding additional functionality, such as weed eating. The assembly includes a base having at least one base bracket for selectively coupling the assembly to the lawn equipment. Further, a stem is included having a stem bracket coupled to the base, a stem housing extending from the stem bracket, and a shoulder in rotational engagement with the stem housing. For maneuvering the assembly, an arm is pivotally engaged with the shoulder of the stem and pivotally coupled to the arm actuator. The arm may be radially, angularly and translatably repositioned during use.

12 Claims, 17 Drawing Sheets

(56) References Cited

U.S. PATENT DOCUMENTS

| | | | |
|---|---|---|---|
| 2018/0027731 A1* | 2/2018 | Self | A01D 34/84 |
| 2018/0077861 A1* | 3/2018 | Lego | A01D 34/4165 |
| 2018/0103582 A1* | 4/2018 | Self | A01D 34/416 |
| 2018/0177124 A1* | 6/2018 | Kuriyagawa | A01D 34/826 |
| 2018/0317373 A1* | 11/2018 | Nielsen | A01D 34/661 |

* cited by examiner

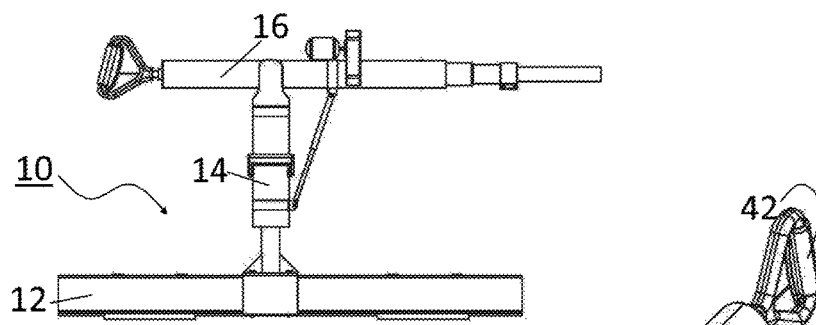
*Fig. 1*A
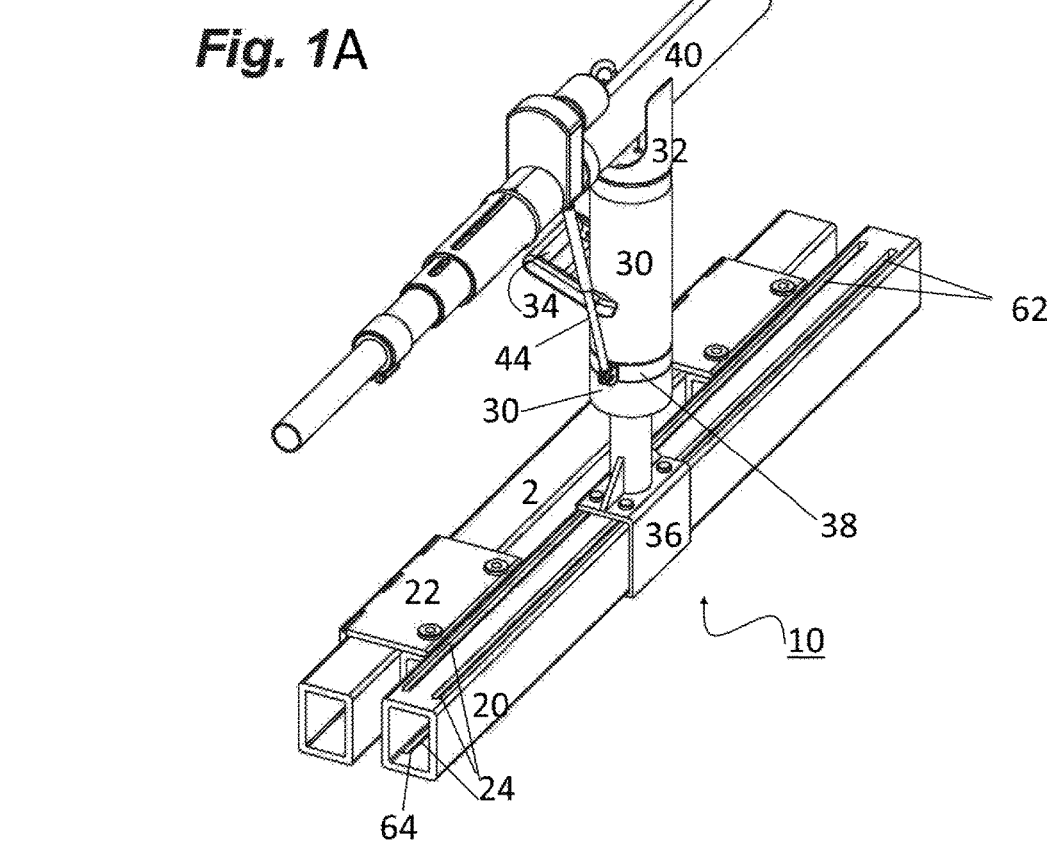
*Fig. 1*B

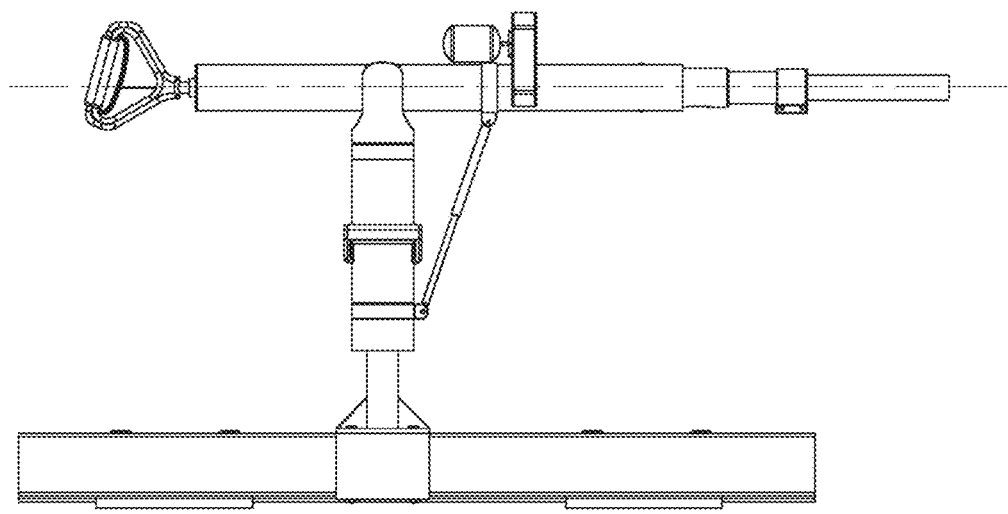
*Fig. 4*A
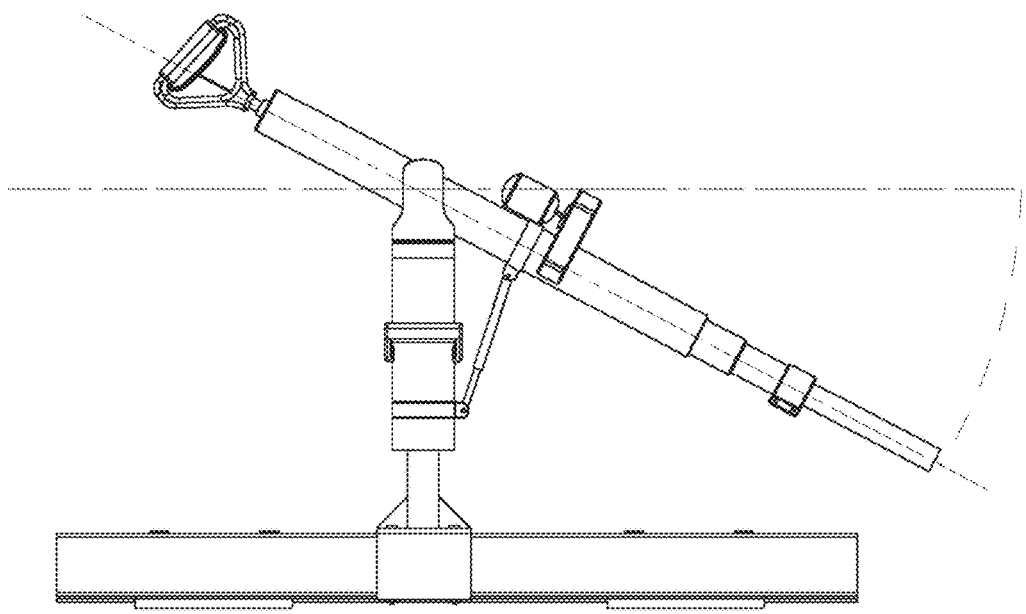
*Fig. 4*B

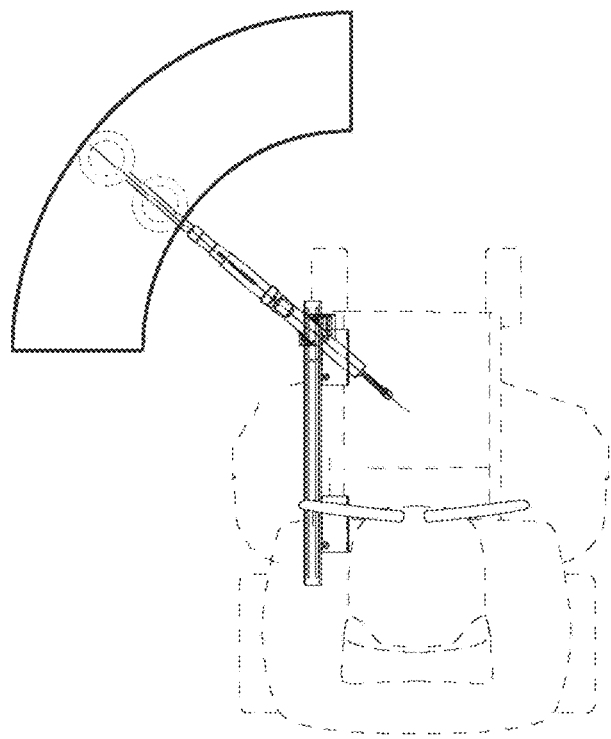
*Fig. 6*A
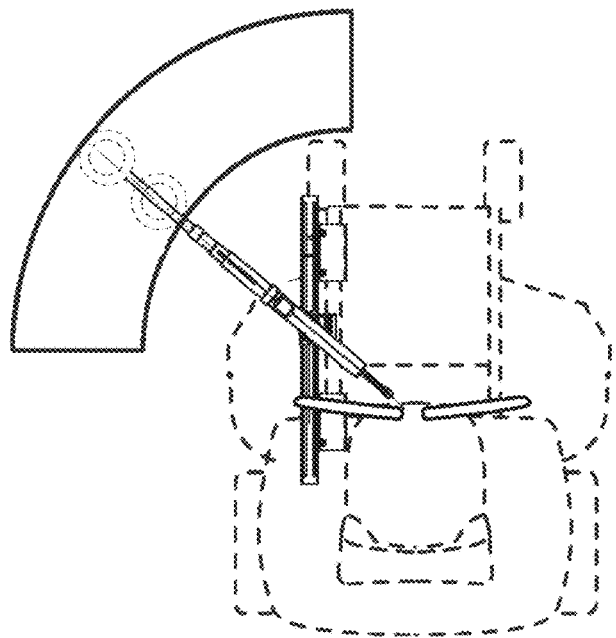
*Fig. 6*B

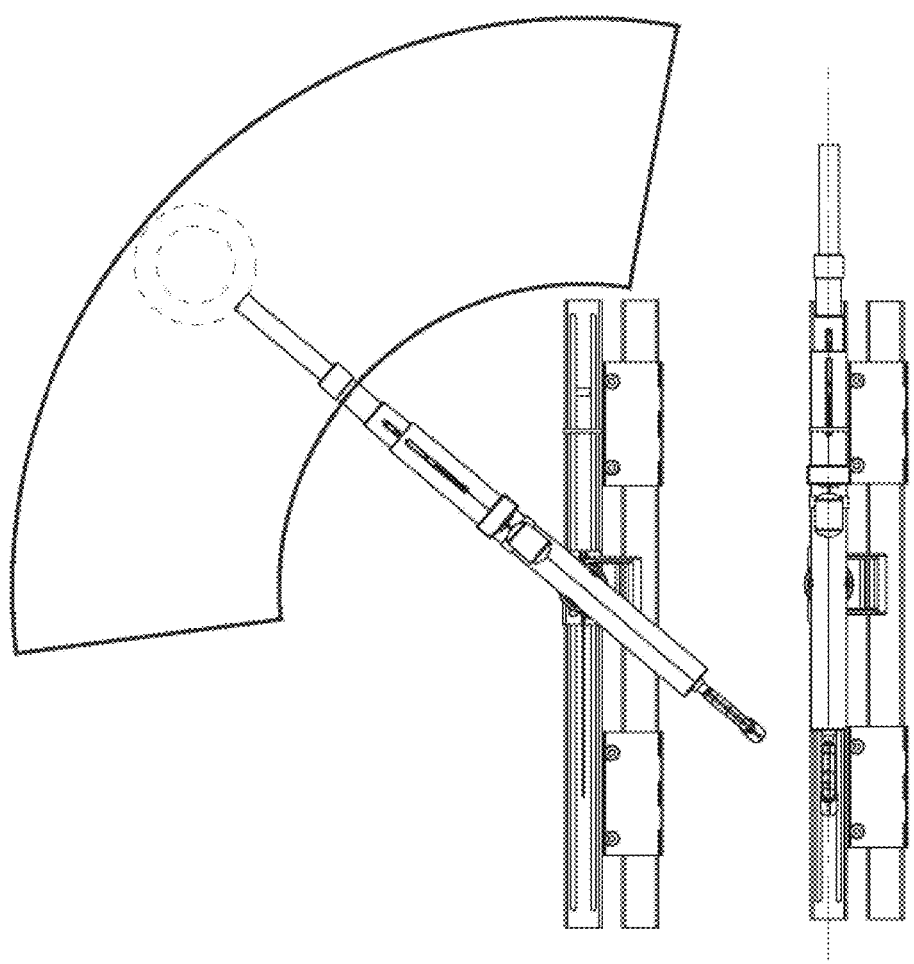
*Fig. 7*A   *Fig. 7*B

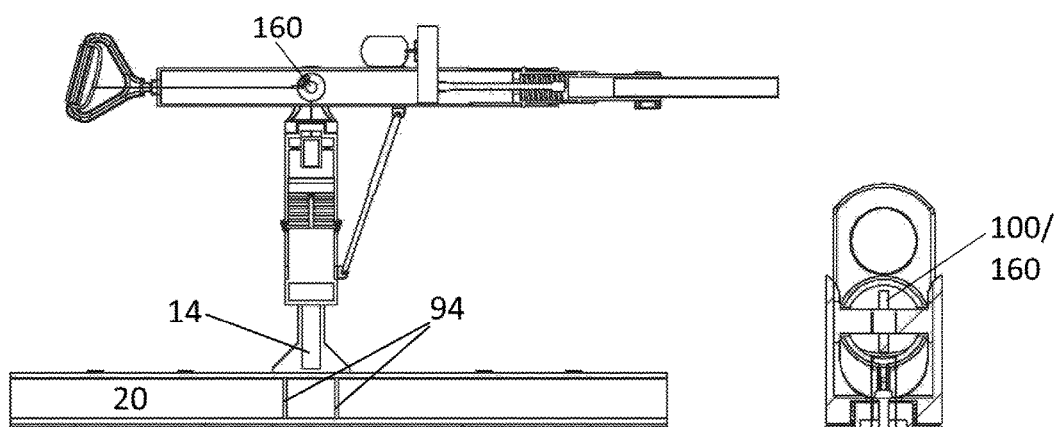
*Fig.* 9A
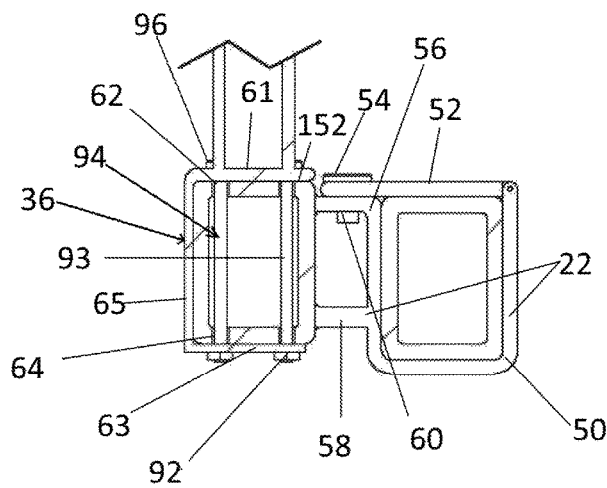
*Fig.* 9B
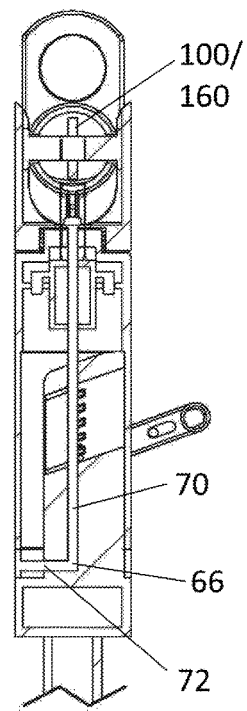
*Fig.* 9C

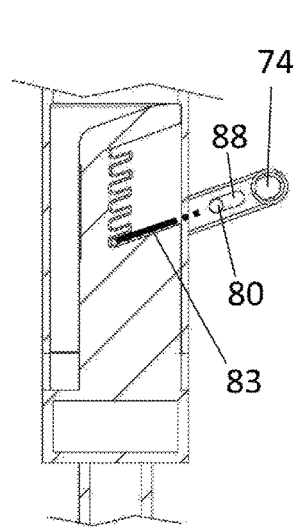 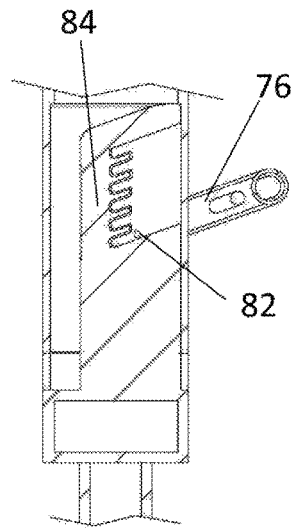 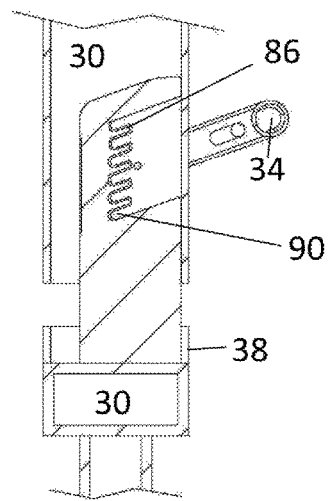
*Fig. 10*A     *Fig. 10*B     *Fig. 10*C

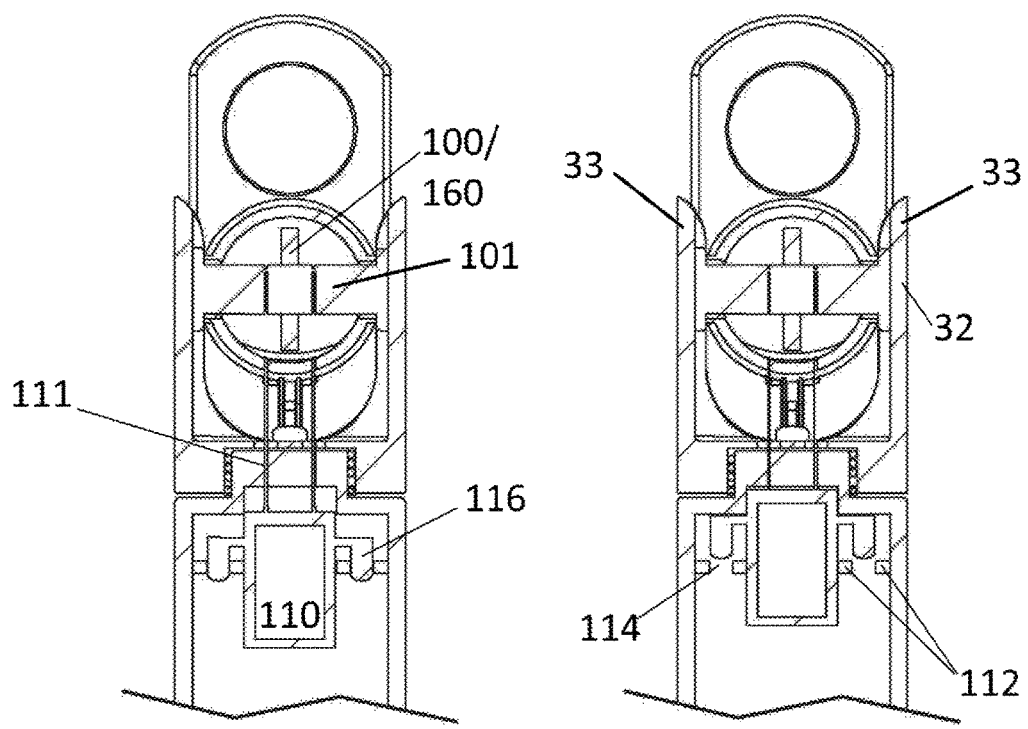
*Fig. 11*A      *Fig. 11*B

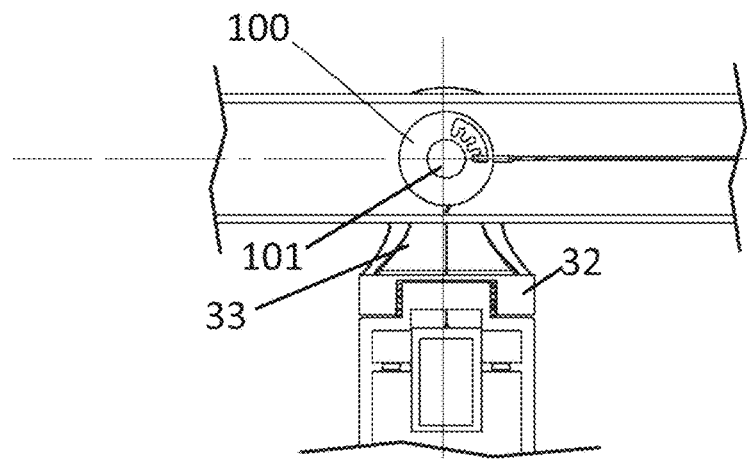
*Fig. 12*A
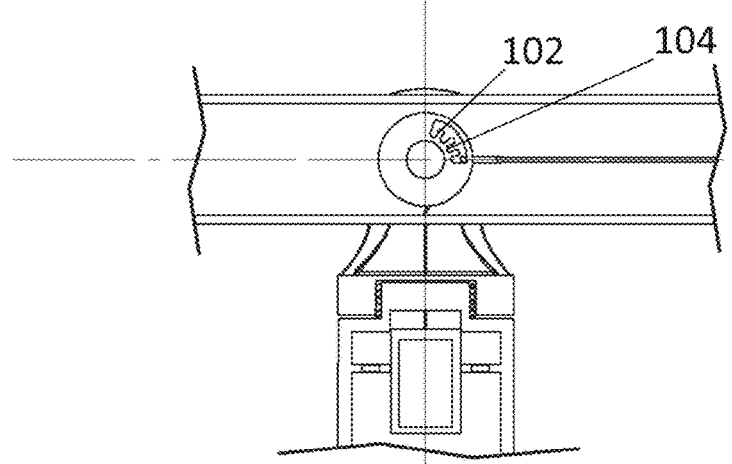
*Fig. 12*B
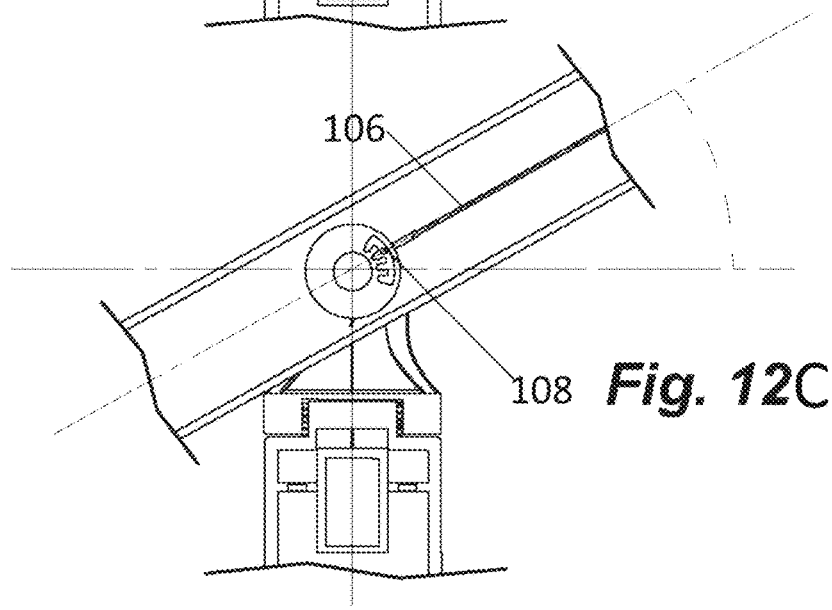
*Fig. 12*C

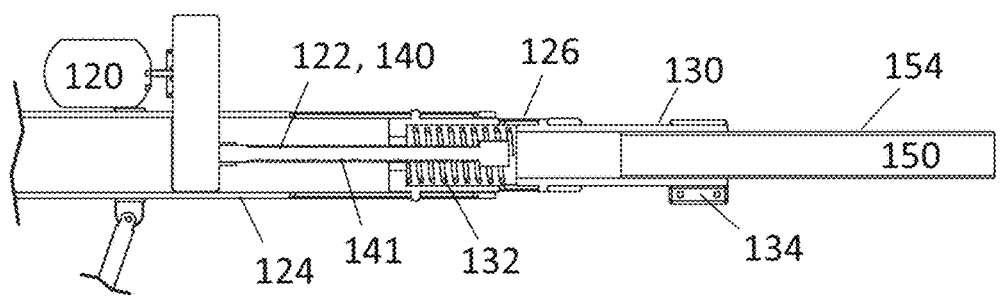
*Fig. 14*A
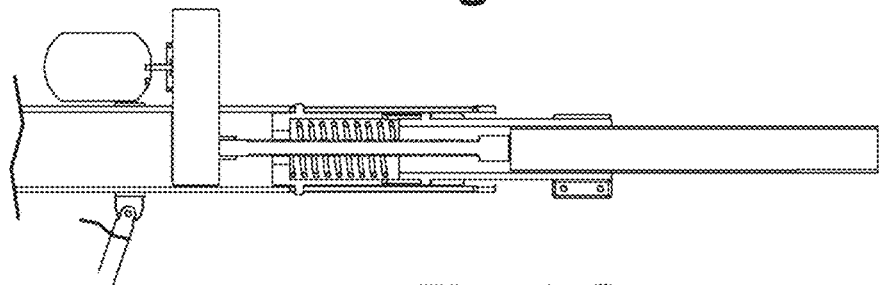
*Fig. 14*B

LAWNMOWER ATTACHMENT ASSEMBLY

CROSS REFERENCE TO RELATED APPLICATIONS

This application claims the benefit of U.S. Provisional Application No. 62/535,845, filed Jul. 22, 2017, which is incorporated herein by reference in its entirety.

TECHNICAL FIELD

The presently disclosed subject matter is directed towards an assembly for coupling an attachment to lawn equipment. Specifically, the assembly permits angular, radial, vertical and spring motions for the attachment relative to the lawn equipment when coupled.

BACKGROUND

Lawn and greenspace maintenance often requires the use of several types of equipment to service and shape the greenery. Switching between equipment may require starting and stopping motors, planning and additional users. While the prior art contains examples of equipment modified for multiple uses, the usability is often cumbersome and inefficient. Further, the ability to retrofit new equipment to old equipment is often overlooked. Such is particularly the case for the modification of existing lawnmowers to be equipped with attachments for weed eating, hedging, trimming or other greenspace maintenance equipment. The ability to effectively and efficiently operate attachments from the seat of a riding lawnmower, for example, without the need to turn off the lawnmower or even the rotating blade, remains a need in the industry.

Accordingly, systems and methods of using an attachment assembly for riding greenery maintenance equipment is disclosed herein that that addresses the various disadvantages and needs of the prior art.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, the claimed subject matter is not limited to implementations that solve any or all disadvantages noted in any part of this disclosure.

According to at least one embodiment, an assembly for use with a lawn equipment is provided. The assembly includes a base including at least one base bracket for selectively coupling the assembly to the lawn equipment; a stem including a stem bracket coupled to the base, a stem housing extending from the stem bracket, and a shoulder in rotational engagement with the stem housing; and an arm pivotally engaged with the shoulder of the stem and pivotally coupled to the arm actuator.

According to at least one embodiment, a method of using an assembly for use with a lawn equipment is provided. The method includes coupling a base bracket of a base of the assembly to the lawn equipment; manipulating a lever and a handle of an arm of the assembly for repositioning the arm with respect to a stem housing of the assembly, wherein the arm is pivotally engaged with a shoulder, the shoulder being radially engaged with the stem housing, wherein the stem housing is coupled to the base of the assembly.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

FIG. 1A is a side view of the assembly according to one or more embodiments of the presently disclosed subject matter.

FIG. 1B is a perspective view of the assembly according to one or more embodiments of the presently disclosed subject matter.

FIGS. 4A and 4B are side views depicting the angular motion of the arm according to one or more embodiments of the presently disclosed subject matter.

FIGS. 6A and 6B are overhead view of the effective zones of the assembly in varying rail positions according to one or more embodiments of the presently disclosed subject matter.

FIGS. 7A and 7B are overhead views depicting the radial motion of the arm according to one or more embodiments of the presently disclosed subject matter.

FIG. 9A is a side cross-section view of the assembly according to one or more embodiments of the presently disclosed subject matter.

FIG. 9B is a front cross-section view of the stem according to one or more embodiments of the presently disclosed subject matter.

FIG. 9C is a front cross-section view of the rail and rail clamp according to one or more embodiments of the presently disclosed subject matter.

FIGS. 10A, 10B and 10C is a front cross-section view of the stem handle in operation according to one or more embodiments of the presently disclosed subject matter.

FIGS. 11A and 11B are cross-section views of the radial lock according to one or more embodiments of the presently disclosed subject matter.

FIGS. 12A, 12B and 12C are cross-section views of the angular lock according to one or more embodiments of the presently disclosed subject matter.

FIGS. 14A and 14B are cross-section views of the extending motion of the arm according to one or more embodiments of the presently disclosed subject matter.

DETAILED DESCRIPTION

Figure 2:
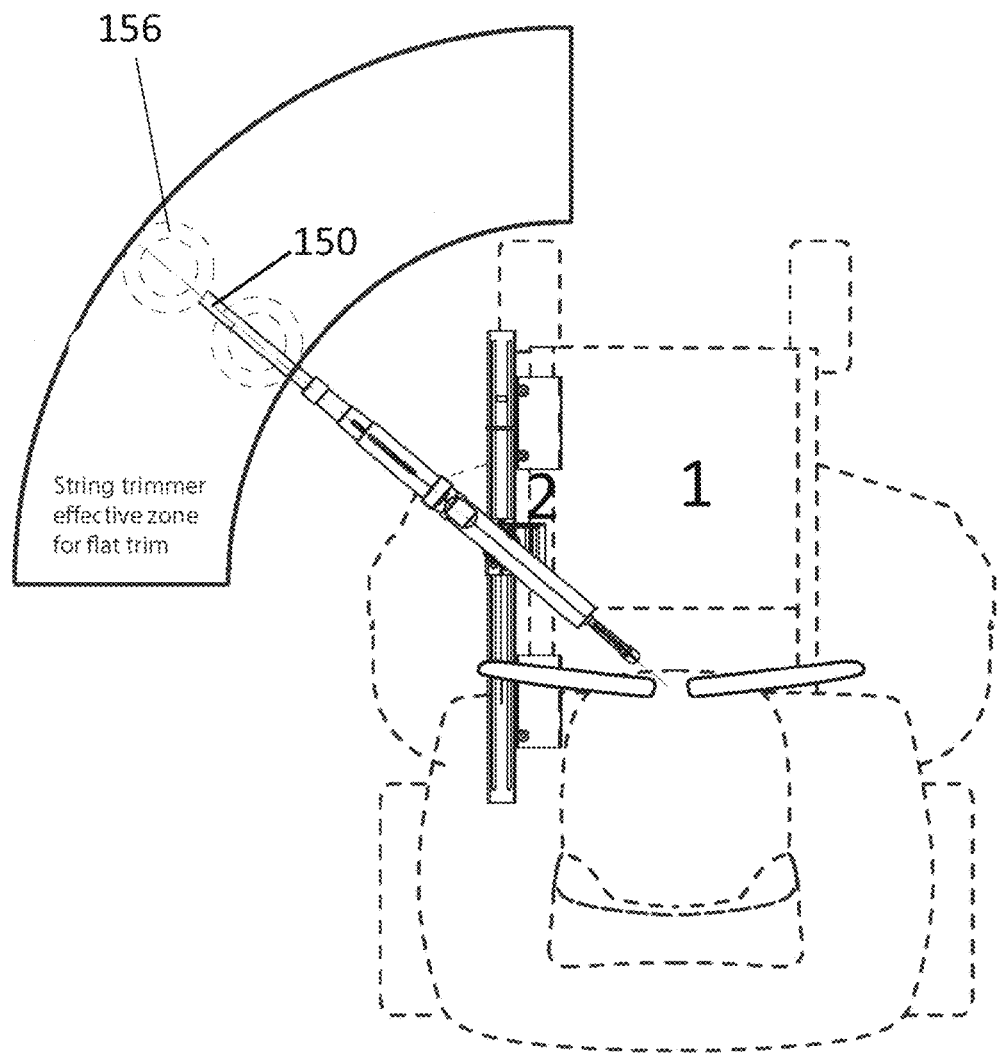
FIG. 2 is an overhead view of the assembly attached to a lawn mower and having a trimmer head attachment operating horizontally according to one or more embodiments of the presently disclosed subject matter.
Figure 3:
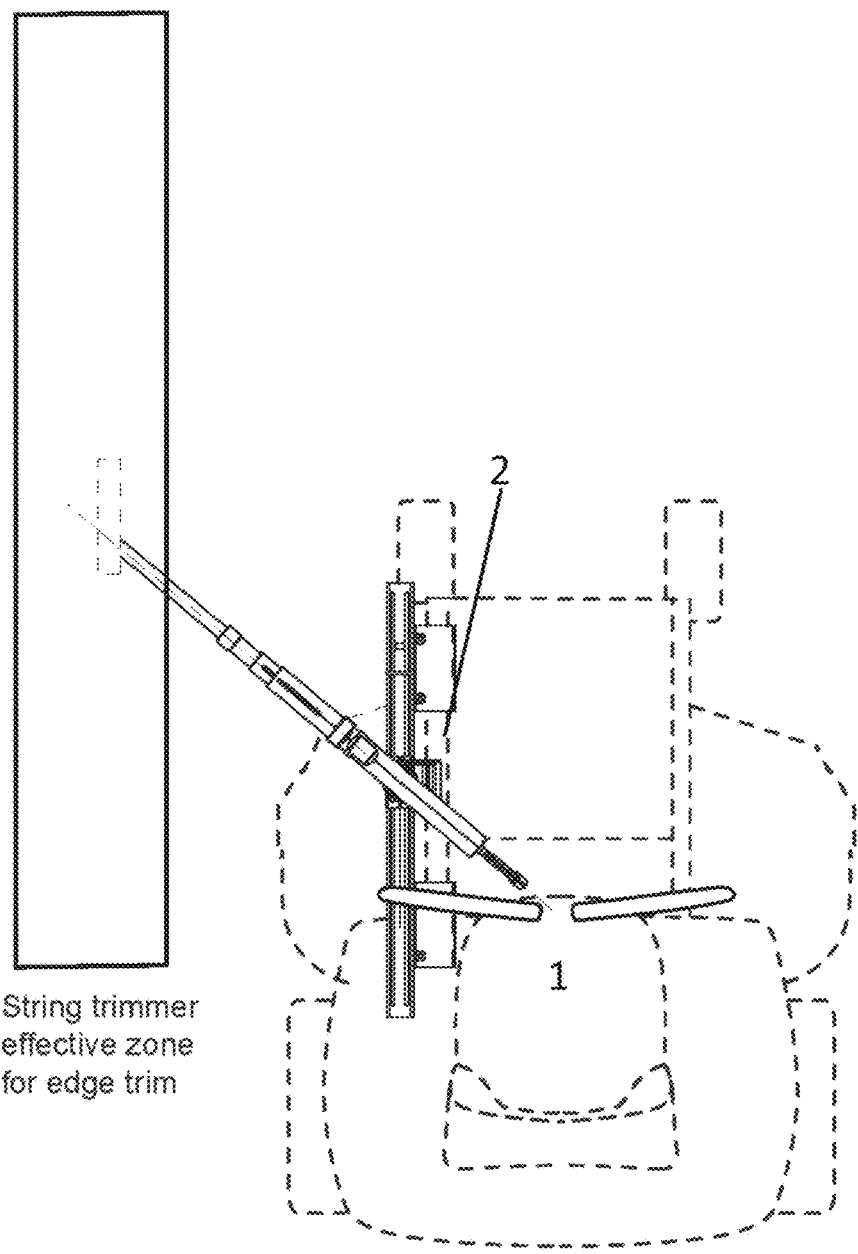
FIG. 3 is an overhead view of the assembly attached to a lawn mower and having a trimmer head attachment operating vertically according to one or more embodiments of the presently disclosed subject matter.
Figure 5A:
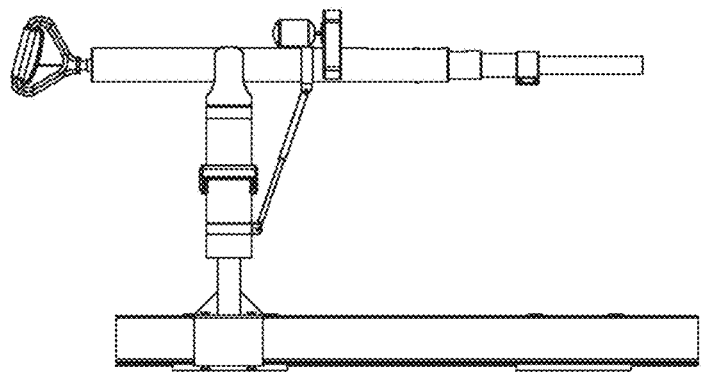
FIGS. 5A, 5B and 5C are side views depicting the track motion of the stem according to one or more embodiments of the presently disclosed subject matter.
Figure 5B:
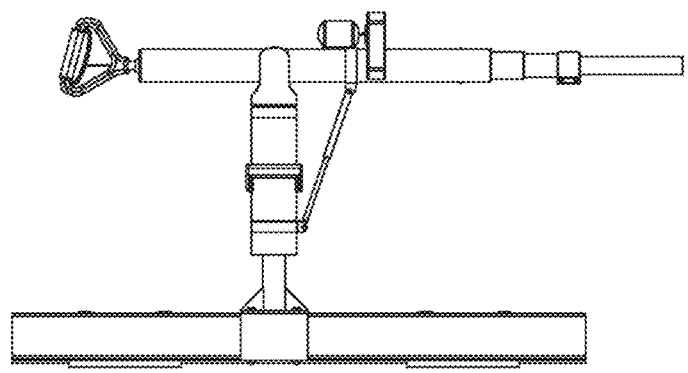
Figure 5C:
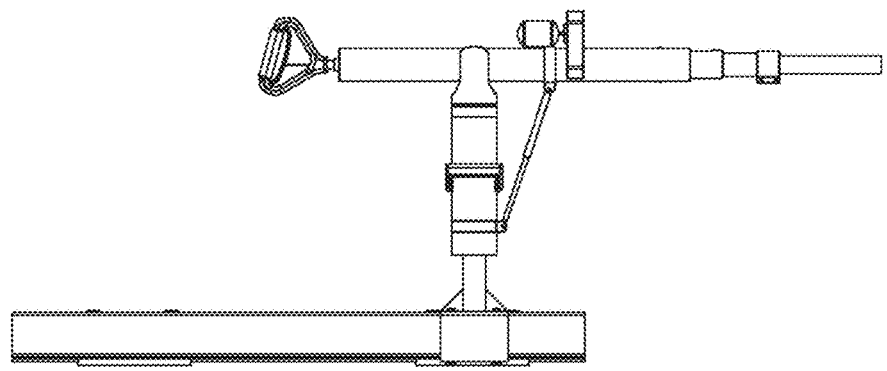
Figure 8A:
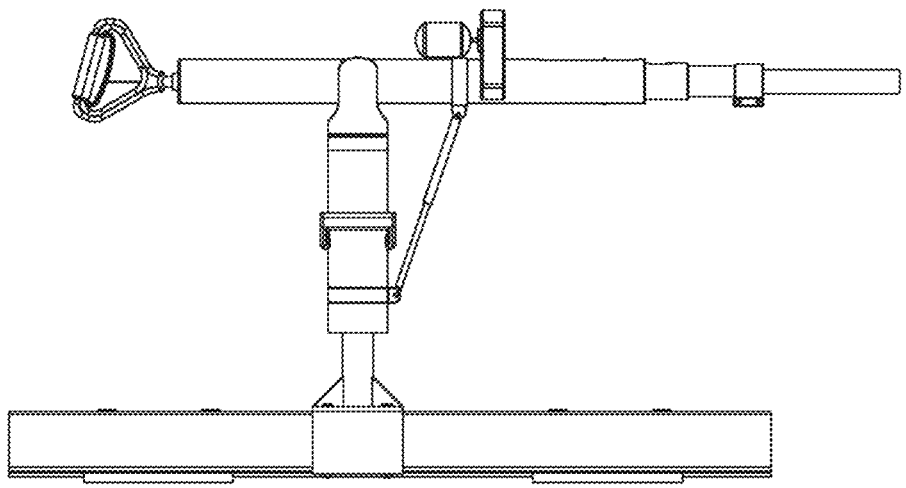
FIGS. 8A and 8B are side views of the height motion of the arm and stem according to one or more embodiments of the presently disclosed subject matter.
Figure 8B:
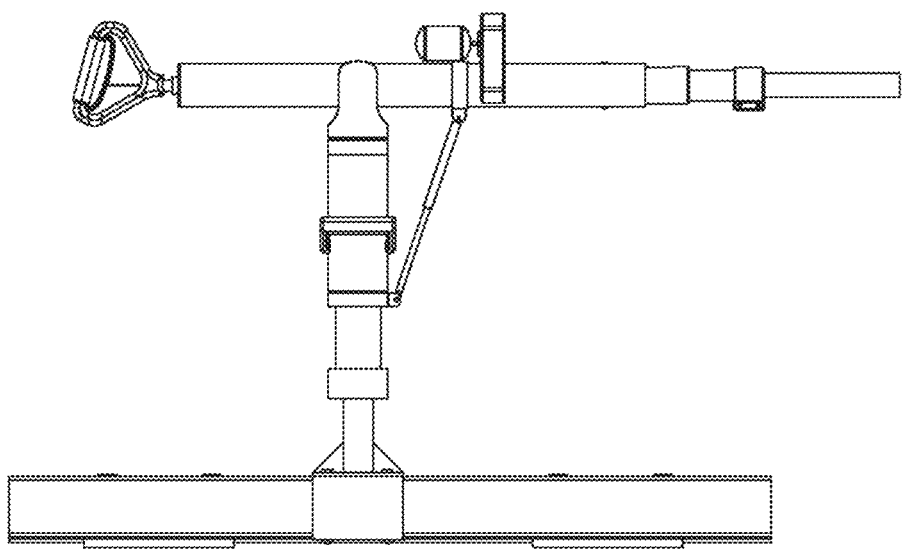

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

FIGS. 1A and 1B depict views of the assembly 10 according to one or more embodiments of the invention. The assembly 10 may include a base 12, a stem 14 and an arm 16. The base 12 may be configured to selectively coupling the assembly 10 to a maintenance equipment, and, in some embodiments, to the deck 2 of a lawnmower 1. Although one skilled in the art can easily envision numerous types of maintenance equipment for which the present invention would be useful, this disclosure will refer to a lawnmower 1 throughout for ease of reading. The assembly 10 may also be useful to selectively couple with an electric wheelchair, truck, SUV, push-mower or some other lawn maintenance equipment.

The stem 14 of the assembly may be coupled to the base 12 in an integrated fashion, or, in some embodiments, may be selectively fastened to the base 12, as is depicted in FIG. 1B. The stem 14 may be translatable along a length of the base 12, as is described more fully herein.

The arm 16 may be coupled to the stem 14, or, in some embodiments, may be selectively fastened to the stem 14. The arm 16 may be pivoted in relation to the stem 14 about an arm axis 101 extending between shoulder fingers 33 of the stem's shoulder 32. The arm 16 may carry an attachment 150 thereon (e.g., see FIG. 2). The attachment 150 may serve any number of purposes, such as, but not including, weed eating, edging, hedge-cutting, blowing and/or other lawn maintenance functions. In some embodiments, the attachment 150 may also serve to provide recreational or comfort functions, such as including a fan or audio/video device.

The base 12 of the assembly 10 may include a rail 20 for positioning alongside, and engaging, the lawnmower 1 and/or deck 2. The rail 20 may define one or more tracks 24 for permitting translation of the stem 14 there-along. Top track(s) 62 and/or bottom track(s) 64 may be included and when applicable, each set of tracks 62, 64 may run along a portion of the length of the rail 20 substantially parallel to each other 62, 64 and to each track 24 of the set of tracks 62, 64 (see FIG. 9B). The rail 20 may be coupled or selectively engaged with a base bracket 22 of the base 12 for selectively coupling the assembly 10 to the lawnmower 1 and/or deck 2. The base bracket 22 may include a base clamp 50 for partially enwrapping a portion of the lawnmower 1 and/or deck 2.

The base bracket 22 may further include a flap 52 pivotally coupled to the base clamp 50 for completely enwrapping a portion of the lawnmower 1 and/or deck 2 and permitting coupling thereto. The base bracket 22 may include a top clamp extension 56 and/or a bottom clamp extension 58 for coupling the base clamp 50 to the rail 20. The top clamp extension 56 and/or the bottom clamp extension 58 may be substantially parallel to each other. One or both of the extensions 56, 58 may define a base aperture 60 therethrough for accepting a base fastener 54 for selectively coupling the flap 52 to the base clamp 50 and/or clamp extension(s) 56, 58.

The stem 14 may couple or selectively fasten to the rail 20 of the base 12 using a stem bracket 36 (see FIGS. 1B and 9B). The stem bracket 36 may define a top portion conformed to a top side of the rail 20, a bottom conformed to a bottom side of the rail 20, and a side portion extending between the top portion and the bottom portion and conformed to a side of the rail 20. As seen in FIG. 9A, one, two, three, four or more track fasteners 94 may be provided for locking and unlocking the stem 14 into position with respect to the rail 20. The track fastener(s) 94 may extend through stem bracket apertures 152 of the stem bracket 36 and through the track(s) 24 of the rail 20. Each track fastener 94 may include a track nut 92, bolt 93 and head 96.

A stem housing 30 of the stem 14 may extend from the stem bracket 36. The stem 14 may have an adjustable height for adjusting the height position of the arm 16, which may rest within or on a shoulder 32 of the stem 14 and positioned above the stem housing 30. A stem handle 34 may be pivotably coupled with the stem housing 30 for adjusting the height of the stem 14, and therefore the arm 16, the operation of which is described more fully herein. The shoulder 32 may be in radial engagement with an uppermost portion of the stem housing 30 for permitting the shoulder 32, and therefore the arm 16, to rotate independently and with respect to the stem housing 30.

A stem sleeve 38 may also be in radial engagement with the stem housing 30, may be positioned along the height of the stem housing 30, and may independently rotate with respect to the stem housing 30. The stem sleeve 38 may be selectively coupled with an arm actuator 44, which may be selectively coupled with the arm 16 for supporting the arm 16, permitting angular movement/pivoting of the arm 16 and permitting rotation of the arm 16, actuator 44 and stem sleeve 38 in unison with respect to the stem housing 30. The shoulder 32 may be coupled with a pole 66, which may include a central portion 70 extending from a central interior of the shoulder 32 downwardly through the stem 14 and/or stem housing 30 and substantially parallel to the stem sleeve 38 (see FIG. 9C). A sleeve portion 72 of the pole 66 may extend from the stem sleeve 38 to the central portion 70 for permitting rotation of the sleeve 38 in unison with any rotation of the sleeve 38.

The stem 14 may include a system for operating the handle 34 for adjusting the height of the stem 14 and arm 16. One embodiment of such a system is depicted by FIG. 10. The stem handle 34 may include a height grip 74, a translatable height handle bar 80 translating within a height aperture 88 of each of the height connections 76. The height handle bar 80 may be connected to the height adjustor bar 82 using height adjustor connections 83, which may be positioned, and translatable within, the height connections 76 for translating the height adjustor bar 82 when the height handle bar 80 is translated. By translating the height adjustor bar 82 towards the height grip 74, the handle 34 may be repositioned vertically to adjust the height of the stem 14 and/or arm 16 as the height adjustor bar 82 is translated vertically amongst the adjustor teeth 86 and grooves 90 of the height adjustor 84. When the height handle bar 80 is released, the height adjustor bar 82 may rest within one of the adjustor grooves 90, between two adjustor teeth 86 which hold the adjustor bar 82 and height grip 74 into a fixed position, at least until the height handle bar 80 is translated towards the grip 74 again for repositioning.

As described, the arm 16 may be vertically pivoted about the shoulder 32 and/or may be rotated in unison with the shoulder 32. The vertical pivot of the arm 16 may be resisted by the actuator 44 positioned between the arm 16 and the stem sleeve 38, which may also serve to stabilize the arm 16 into position. The rotation of the arm 16, and/or the shoulder 32 in which it may rest, may be rotated with respect to the lawnmower 1, rail 20 and/or housing 30.

Figure 16A:
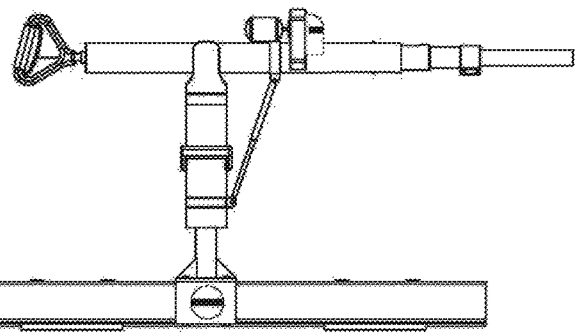
FIGS. 16A and 16B depict sensor placement according to one or more embodiments of the presently disclosed subject matter.
Figure 16B:
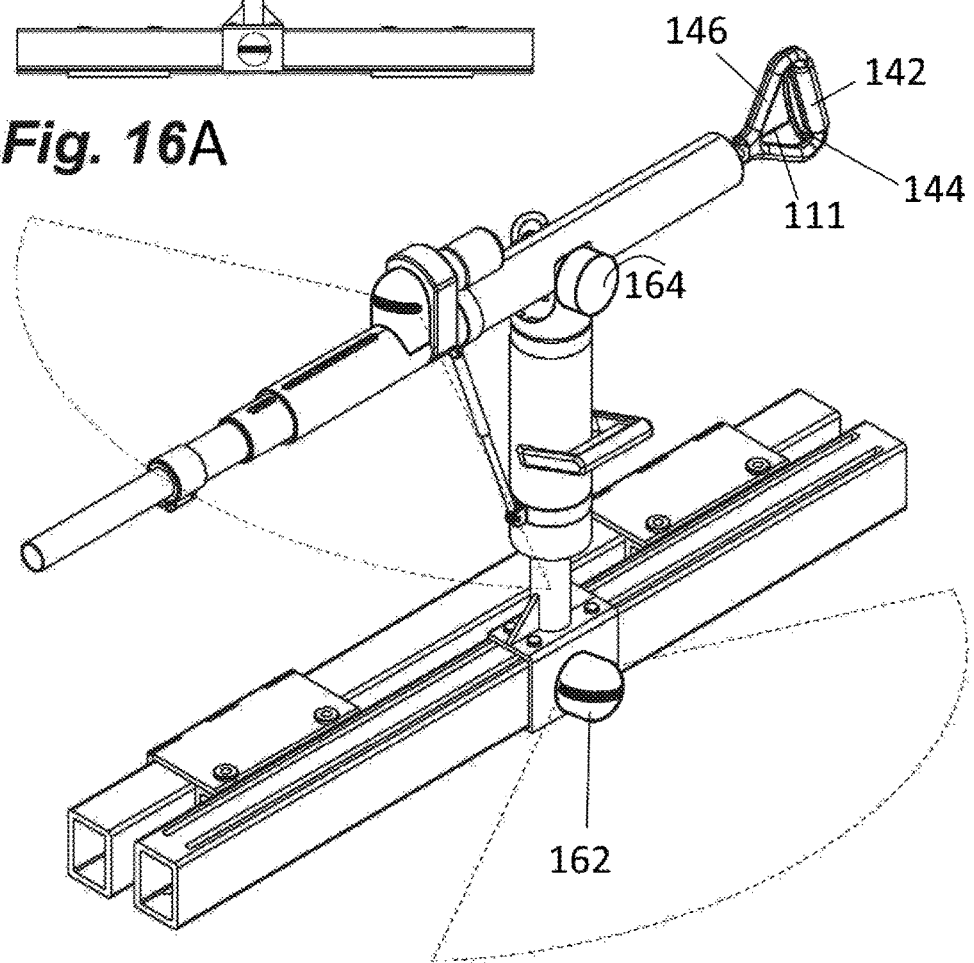
Figure 17:
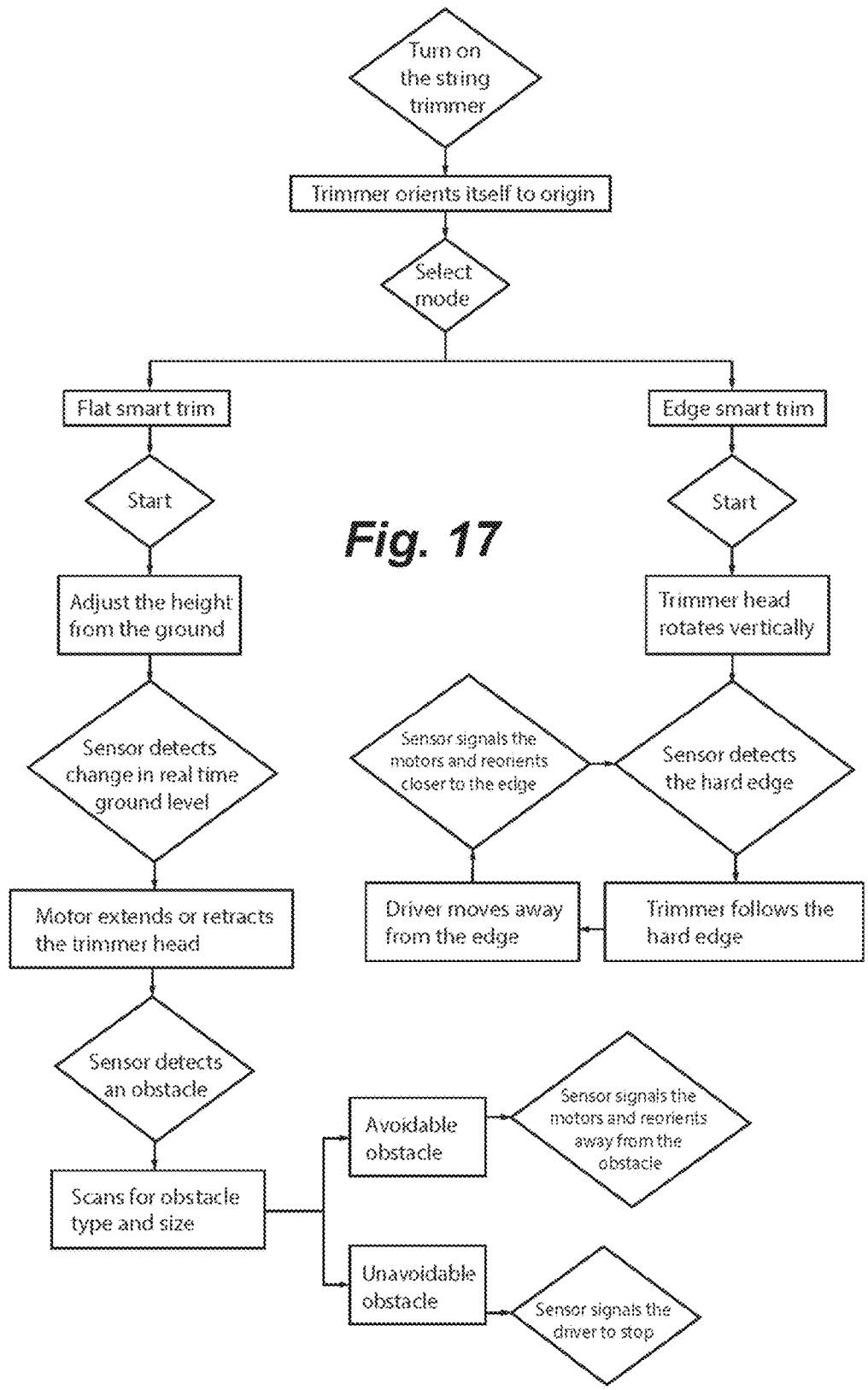
FIG. 17 is a schematic view of the operation of a sensor-equipped attachment according to one or more embodiments of the presently disclosed subject matter.

The arm 16 may include an arm handle 42 for maneuvering the arm 16 (see FIGS. 16A and 16B). The arm 16 may include an arm handle grip 142 for maneuvering the arm 16. The arm 16 may further include one or more arm levers 144 for permitting radial, angular or translating movement of the arm 16, and/or locking of the arm 16 into radial, angular or translating position. The one or more arm levers 144 may include buttons, switches, bars and/or any other mechanism for manipulating cables, wires, electrical signals or other mechanical components of the assembly 10. As depicted in FIG. 16B, the lever 144 may be a bar attached to an angular cable 111, whereupon translating the lever 144 towards the handle grip 142 would translate the cable 111.

In one embodiment, as depicted in FIG. 11, one or more radial cables 111 extend from one of the arm levers 144, through the arm 16, about a radial pulley 160 (or the angular lock 100), then through the shoulder 32, to a radial lock 110. By activating the lever 144, through depression, translation or other manipulation, the radial cable 111 may be translated and the radial lock 110 may be vertically translated, thereby raising the radial lock arms 116 above the plate apertures 114 defined by the housing plate 112. The housing plate 112 may be positioned within the stem housing 30 and define a plurality of plate apertures 114, which may be equally spaced apart and equidistance from the circumference of the housing plate 112. Upon raising the radial lock 110, the arm may be radially pivoted into position using the arm handle 42, at which point the radial lock 110 may be lowered. The radial lock arms 116 may be shaped with a pointed end and the plate apertures 114 may include minimal spacing therebetween, such that any lowering of the radial lock 110 will ensure that the radial lock arms 116 engage a pair of plate apertures 114. Alternatively, the handle may be manipulated for engaging the radial lock arms 116 into a proximal pair of plate apertures 114.

As is depicted in the embodiment of FIGS. 12A-C, one or more angular cables 106 extend from one of the arm levers 144, through the arm 16 to an angular lock 100 centered about the arm axis 101 extending between the shoulder fingers 33 of the shoulder 32. The angular lock 100, similar to the height adjustor 84 described herein, defines a plurality of angular teeth 102 and angular grooves 104 (although the angular teeth and grooves are radially spaced instead of linearly spaced as is depicted in the embodiment of the height adjustor of FIG. 10). By activating the lever 144, through depression, translation or other manipulation, the angular cable 106 may be translated and the angular rod 108 may be translated towards the arm handle 42 for pivoting about the plurality of teeth and grooves 102, 104. Upon releasing (or deactivating) the lever 144, the angular rod 108 may be translated away from the arm handle 42 and within one of the angular grooves 104 for locking the arm 16 into angular position.

Figure 13A:
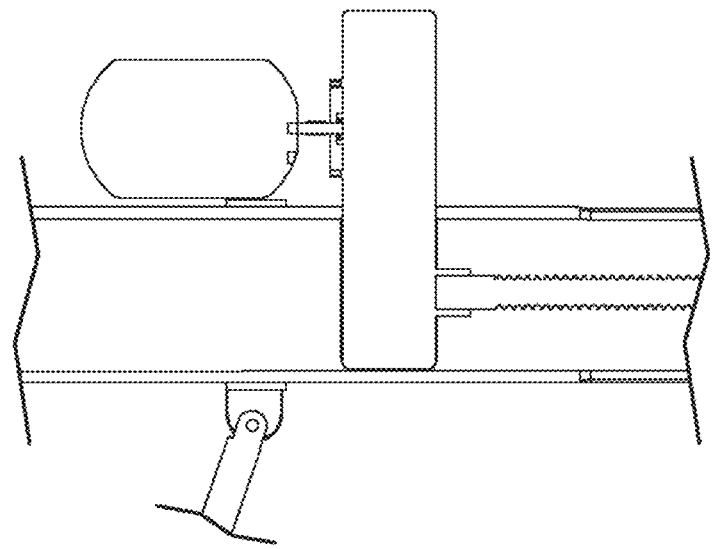
FIGS. 13A and 13B are cross-section views of the motor positioned on the arm according to one or more embodiments of the presently disclosed subject matter.
Figure 13B:
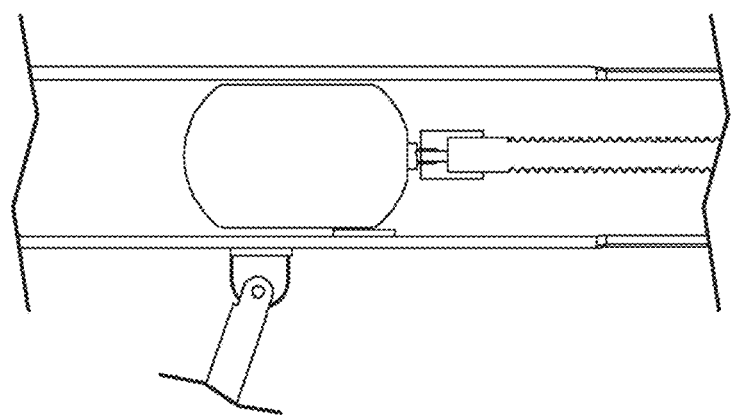
Figure 15A:
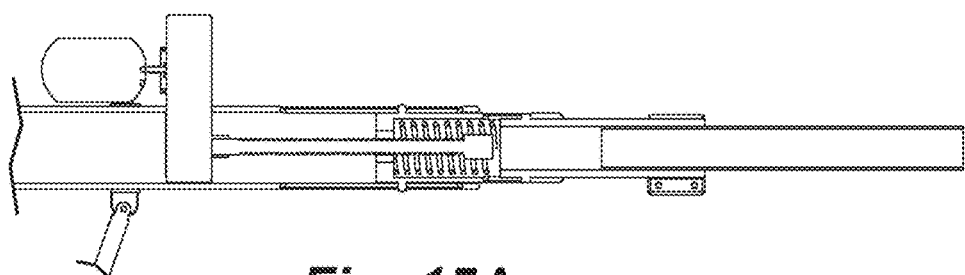
FIGS. 15A and 15B are cross-section views of the spring motion of the arm according to one or more embodiments of the presently disclosed subject matter.
Figure 15B:
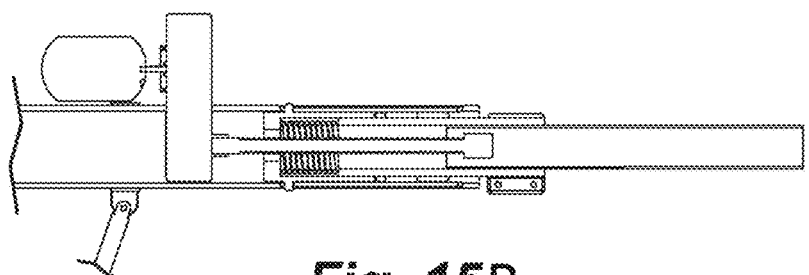

FIGS. 13-15 depict various embodiments of an arm motor 120 and arm actuator 122 being used for extending and contracting (translating) various arm housing sections 124, 126, 130 of the arm 16. The motor 120 may be activated and deactivated using one of the arm levers 144. The arm motor 120 may be housed interior or exterior of the arm 16. A second housing section 126 of the arm may define a spiraled aperture on an end closest to the arm handle 42 for permitting rotation of an arm rod 140 (acting as an arm actuator 122) defining a spiral groove 141 to translate the second housing section 126 depending on the rotation of the arm rod 140. The arm rod 140 may be rotated by the operation of the arm motor 120 or via a cable or rod extending from one of the levers 144. The extension and contraction of the second housing section 126 thereby extends or contracts the attachment 150.

The second housing section 126 (or the first housing section 124) may house an arm spring 132 therewithin for engaging a third housing section 130 (or the second housing section 126) and permitting translation of the third housing section 130 (or the second housing section 126) when pressure is applied to the attachment 150. Such a feature would allow the attachment 150 to bounce off or adjust to environmental objects during use.

The attachment head 150 of the attachment may be pivoted through manipulation of one of the levers 144 for adjusting the angle of the head 150 relative to the environmental surface with which the head is interacting 150. For example, in the case of weed-eating a yard, the weedeater head may be positioned in a substantially horizontal position, may be angled to cut the vegetation of an upcoming hill or valley, or may be substantially perpendicular for edging.

As seen in FIGS. 2, 6 and 7, the effective zone of use for the attachment 150 may vary depending on the manipulation of the angular, radial, height and translations of the arm 16.

Further, as depicted in FIG. 16, the operation of the attachment 150 may be partially or fully controlled through the use of sensors 162 for detecting the shape and contour of the surrounding environment, sending such data through wires or wirelessly to a local or remote processor, and instructing motors and/or other electromechanical components to adjust the position of the attachment 150 accordingly. One or more of the sensors 162 may be stereoscopic visual sensors, as depicted in FIG. 16B. The pivoting of the arm 16 in relation to the stem 14 may be effectuated using a servo motor 164 controllable by a wired and/or wireless button, located on a phone, physical device with wireless capabilities, or a physical device with a wired connection to the motor 164.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

The invention claimed is:

1. An assembly for use with lawn equipment, comprising:
   a base including at least one base bracket for selectively coupling the assembly to the lawn equipment;
   a stem including a stem bracket coupled to the base, a stem housing extending from the stem bracket, and a shoulder in rotational engagement with the stem housing,
   wherein the stem bracket defines a top portion conformed to a top side of a rail, a bottom conformed to a bottom side of the rail, and a side portion extending between the top portion and the bottom portion; and
   an arm pivotally engaged with the shoulder of the stem and pivotally coupled to an arm actuator.

2. The assembly of claim 1, wherein the rail defines tracks for permitting translation of the stem.

3. The assembly of claim 1, further including rack fasteners extending through tracks defined by the rail and apertures defined by the stem bracket.

4. The assembly of claim 1, wherein the base bracket further includes:
   a clamp for partially enwrapping a portion of a deck of the lawn equipment;
   a flap pivotally coupled to the clamp for completely enwrapping a portion of the deck;
   a base fastener for locking the flap into position.

5. The assembly of claim 1, wherein the stem further includes a stem handle for adjusting a height of the stem.

6. The assembly of claim 1, wherein the stem further includes a stem sleeve in rotational engagement with the stem housing and pivotally coupled to the arm actuator; and a pole extending from the shoulder centrally through the stem housing to the sleeve, the pole defining a central portion extending from the shoulder and a sleeve portion extending perpendicularly therefrom to the sleeve.

7. The assembly of claim 1, wherein the arm further includes an arm handle for maneuvering the arm.

8. The assembly of claim 1, wherein the arm further includes one or more arm levers for repositioning the arm.

9. The assembly of claim 8, wherein one of the one or more arm levers is engaged with a radial lock for radially repositioning the arm with respect to the stem housing.

10. The assembly of claim 8, wherein one of the one or more arm levers is engaged with an angular lock for angular repositioning of the arm with respect to the stem housing.

11. The assembly of claim 8, wherein one of the one or more arm levers is in communication with an arm motor for translationally repositioning the arm with respect to the stem housing.

12. The assembly of claim 1, wherein the arm further includes a spring housed therewithin for permitting a distal section of the arm to translatably adjust when coming in contact with surrounding environmental objects.

* * * * *